United States Patent [19]

Cotter

[11] Patent Number: 5,443,580
[45] Date of Patent: Aug. 22, 1995

[54] COMPACT FITTING

[75] Inventor: Jonathan P. Cotter, Dearborn, Mich.

[73] Assignee: Diebolt International, Inc., Detroit, Mich.

[21] Appl. No.: 324,722

[22] Filed: Oct. 18, 1994

[51] Int. Cl.6 .............................................. F16L 43/00
[52] U.S. Cl. ..................................... 285/179; 285/276; 285/305; 285/349
[58] Field of Search ................ 285/276, 305, 179, 349

[56] References Cited

U.S. PATENT DOCUMENTS

| | | | |
|---|---|---|---|
| 1,961,583 | 6/1934 | Hamer | 285/276 X |
| 1,989,980 | 2/1935 | Hamer | 285/276 X |
| 3,127,199 | 3/1964 | Roe | 285/305 X |
| 3,294,359 | 12/1966 | Bauer | 285/276 X |
| 3,795,924 | 3/1974 | Kempler | 285/276 X |
| 4,247,135 | 1/1981 | Weirich | 285/305 X |
| 4,431,218 | 2/1984 | Paul | 285/305 |
| 4,432,570 | 2/1984 | Kemppainen | 285/276 X |
| 4,804,206 | 2/1989 | Wood et al. | 285/276 X |

Primary Examiner—Dave W. Arola
Attorney, Agent, or Firm—Barnes, Kisselle, Raisch, Choate, Whittemore & Hulbert

[57] ABSTRACT

A fluid connector fitting which reduces the required space for assembly in fluid handling systems. The fitting has an internal sealing face which, together with a conventional fluid adapter fitting, forms a fluid tight seal. A swivel nut is rotatably mounted in the body by a retainer. The swivel nut is internally threaded for connection with the adapter fitting.

14 Claims, 2 Drawing Sheets

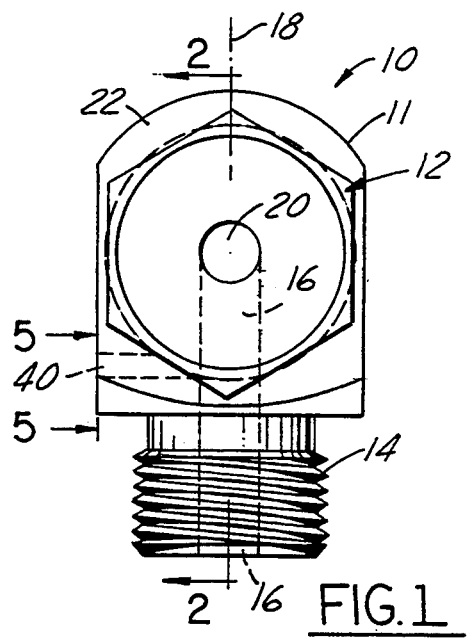
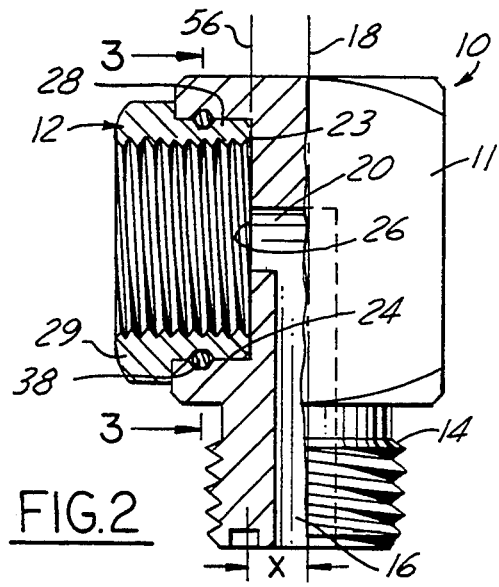
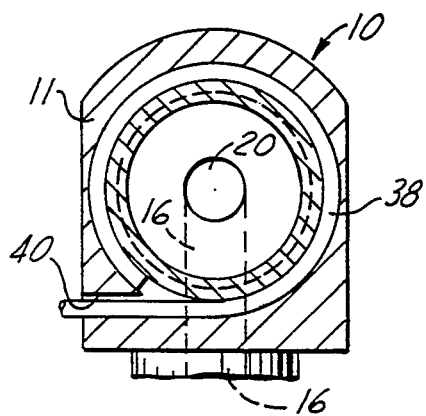
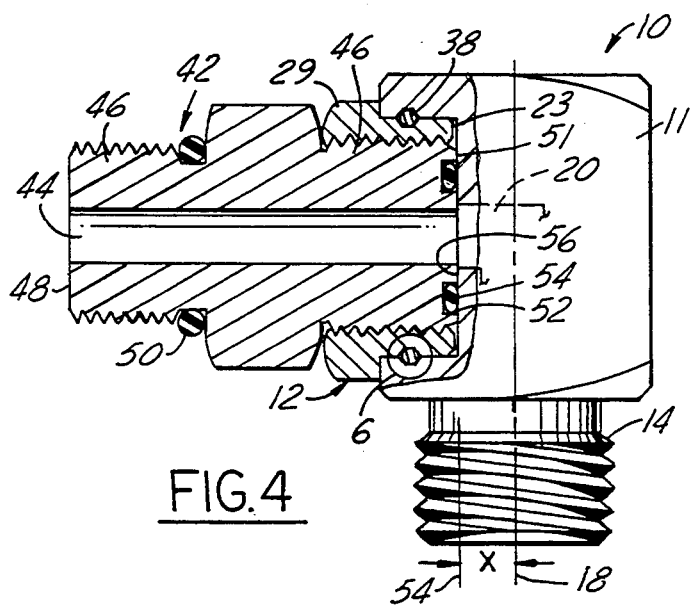
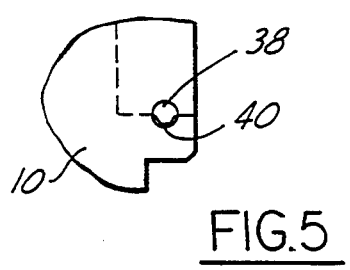
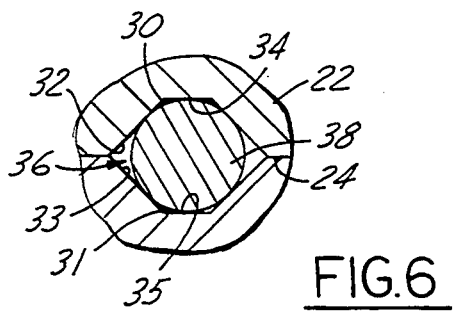
FIG.1
FIG.2
FIG.3
FIG.4
FIG.5
FIG.6

COMPACT FITTING

FIELD OF THE INVENTION

This invention relates to fluid connector fittings and more particularly to a compact swivel nut fitting that requires less assembly space than conventional fittings.

BACKGROUND OF THE INVENTION

Fluid handling systems often employ swivel nut fittings to deliver high pressure air, gas or hydraulic fluid to fluid-operated devices such as nitrogen gas springs often used in stamping operations to yieldably hold a device such as a clamping ring of a die assembly. Such devices often have limited space and require its components to be as compact as possible.

Conventional swivel nut fluid fittings, commonly referred to as swivel nut elbow or T-fittings, comprise a fitting body having a fluid passage therein to supply fluid from a source to the fluid-operated device via a straight port adapter, typically at a 45° or a 90° angle thereto. A hose or pipe from the source is usually connected to the male portion(s) of the swivel nut fitting by a hose adapter. The swivel nut is formed or retained on the outside diameter of a flange extending outwardly from the connector fitting body. An outside surface on the flange defines a seal face against which the fluid adapter abuts to form a fluid-tight seal therebetween. Thus, the distance between the seal face and the central axis of the fitting body defines how far the fluid adapter will protrude from the fitting body.

Usually, the seal face lies in a plane parallel to the central axis of the fitting body. In prior fittings, the distance between the seal face plane and the fitting body axis is relatively large for use in fluid systems with limited space, typically about twice the coupling hose or pipe diameter.

SUMMARY OF THE INVENTION

The fluid connector fitting of this invention is very compact and reduces the distance between the sealing face and the central axis of the fitting body for O-ring face seal fittings. The fitting body has an internal counterbore having a shoulder or end wall which forms the sealing face. A swivel nut is received within the bore and is secured by a retainer. The swivel nut has an internally threaded through bore to receive a male adapter having an O-ring at one end that engages the sealing face to form a fluid-tight seal. Since the seal face is located within the fitting body itself, the distance between the seal face and the central axis of the fitting body is substantially reduced.

Objects, features and advantages of this invention are to provide a swivel nut fluid connector fitting that reduces the distance between the sealing face of the fitting body and the central axis thereof, provides a sealing face within the fitting body itself, provides a number of seals consistent with conventional face seal fittings, provides a swivel nut received within the fitting body, retains the swivel nut in the fitting body, is compact, saves space, is easy to assemble, and is rugged, durable, reliable, of relatively simple design and economical manufacture and assembly.

BRIEF DESCRIPTION OF THE DRAWINGS

These and other objects, features and advantages of this invention will be apparent from the following detailed description of the preferred embodiments and best mode, appended claims, and accompanying drawings in which:

FIG. 1 is a front view of a swivel nut fluid fitting embodying this invention;

FIG. 2 is a partial cross-sectional view taken along line 2—2 of FIG. 1;

FIG. 3 is a cross-sectional view taken along line 3—3 of FIG. 2;

FIG. 4 is a partial cross-sectional view similar to FIG. 2 showing a typical fluid port adapter connected to the swivel nut fitting;

FIG. 5 is a partial side view taken along line 5—5 of FIG. 1;

FIG. 6 is an enlarged and fragmentary cross-sectional view of the retainer for securing the swivel nut to the fitting body;

DETAILED DESCRIPTION

Figure 7:
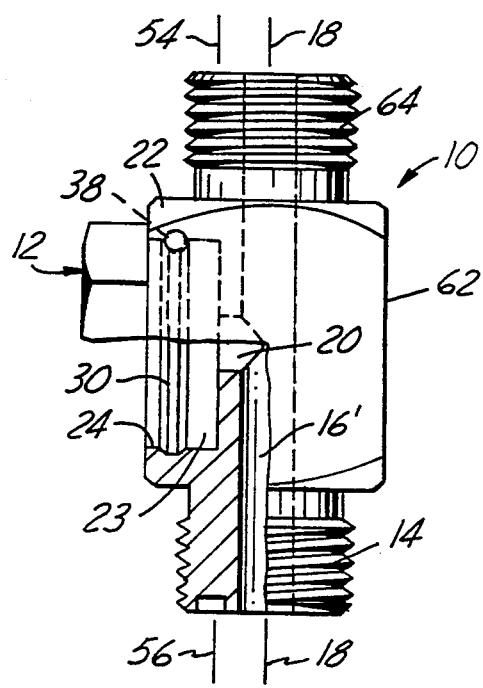
FIG. 7 is a front view of a second embodiment of the present invention.

Referring now more particularly to the drawings, there is shown a swivel nut fluid connector fitting 10 having a body 11 and a swivel nut 12. The body 11 has an externally threaded male portion 14 with a central fluid passage 16 and an 0-ring (not shown) that connects in fluid-tight relation to a hose adapter (not shown). The passage 16 extends along a first axis 18 and communicates with a second non-parallel passage 20 within a female portion 22.

The female portion 22 has an internal counterbore 23 which forms an annular side wall 24 and a shoulder or end wall seal face 26 communicating with the second passage 20. The internally threaded swivel nut 12 has an annular portion 28 received within the internal counterbore 23 of the fitting body 12 and a hexagonal head portion 29 that extends outside the internal counterbore 23. The sidewall 24 of the fitting body 11 and the swivel nut 12 have opposed complementary circumferential grooves 30 & 31 (FIG. 6) formed by angular sidewalls 32 & 33 extending preferably at about 45° from a horizontal plane and flat bottom walls 34 & 35. When the swivel nut 12 is disposed in the counterbore 23, the grooves 30 & 31 form an annular passage 36 that receives a retainer 38 which axially retains the swivel nut 12 to the fitting body 11 while permitting the nut to rotate or swivel on its axis. The retainer 38 is preferably in the form of a flexible wire and is inserted into the passage 36 through a tangential radial opening 40 (FIGS. 3 and 5) in the body 11 which communicates with the retainer passage 36. In assembly, the wire retainer 38 prevents the nut 12 from being pulled axially out of the body 11 but allows it to rotate in order to threadably engage and secure a conventional fluid adapter 42 (FIG. 4).

In FIG. 4, the shown fluid adapter 42 represents only one example of a variety of fluid adapters. It should be understood that in all fluid adapters, the male seal face is received in the swivel nut. The shown adapter 42 has a through passage 44 that communicates with passage 20 for supplying fluid to a fluid-powered device. One end 48 has complementary male threads 45 adapted to be threadably received in a threaded female port for supplying pressurized fluid to the fluid-powered device or another connector and has an O-ring 50 to prevent fluid leakage therebetween. The opposite end has male threads 46 and an end face seal 51 received within the internally threaded swivel nut 12 which has a recess 52 with an O-ring 54 received therein. When the fluid adapter 42 is threaded into the swivel nut 12 and the nut is tightened, the male face seal 51 and the O-ring 54 bears on the end wall seal face 26 to form a fluid-tight seal. The hexagonal head portion 29 of the nut 12 always remains exposed outside of the bore 23 of the body 11 for easy access for a tool to rotate the swivel nut 27 to threadably connect and disconnect the fluid adapter 42 thereto. The end wall seal face 26 lies in a plane 56 (FIGS. 2 and 4) extending parallel to the central axis 18 of the body 11. Both the end wall seal face 26 and the external hexagonal portion 29 of the nut lie closely adjacent to the central axis 18. Typically, the distance X (FIG. 2) between the end wall seal face 26 and the central axis 18 ismless than the diameter of the central fluid passage 16. This saves substantial space and produces an extremely compact construction. This is particularly important for gas spring assemblies where space is very limited.

FIG. 7 illustrates a T-connector 60 embodying this invention with a swivel nut 12 rotatably mounted in a body 62 by a retainer wire 38 received in an annular passage 36 defined by the complementary opposed grooves 30 and 31 in the body and nut respectively. Externally threaded male coupling portions 14 and 64 at opposed ends of the body communicate with a central through passage 16' which extends at a right angle to and communicates with the passage 20.

Figure 8:
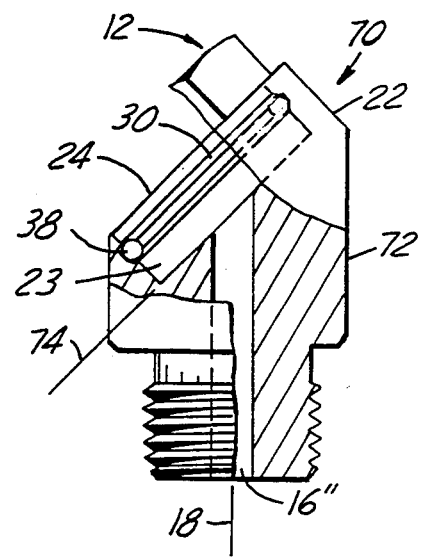
FIG. 8 is a front view of a third embodiment of the present invention.

FIG. 8 illustrates a 45° elbow 70 embodying this invention with a swivel nut 12 rotatably mounted in a body 72 by a retainer wire 38 disposed in an annular passage 36 defined by the complementary opposed grooves 30 and 31 in the nut and body respectively. An externally threaded male coupling portion 14 on one end of the body 72 communicates with the swivel nut 12 through a passage 16" which opens directly into the seal face 26 which lies in plane 74 inclined at an acute included angle of 45° to the axis 18 of the passage 16".

During installation, typically the adapter 42 is already connected to a device or another connector, the swivel fitting 10, 60 or 70 is connected to a hose or pipe, and then its swivel nut 12 is connected to the adapter 42. Preferably, the nut 12 is manually threaded on the male face seal end 51 of the adapter 42 and rotated to tighten it with a wrench or similar tool engaging the flats of the hexagonal head portion 29 of the nut 12. This prevents twisting of the hose or pipe to which the swivel fitting is already attached.

I claim:

1. A fluid connector fitting for use with an adapter having a body with a threaded portion with an end face, a passage opening through the end face and an annular seal received on the end face, encircling the passage and opening through the end face, the fitting comprising, a fitting body having a nut receiving bore opening to the exterior of the body and having a circumferential side wall and an end wall, a threaded connector portion spaced from said bore, a first internal passage communicating said connector portion with said bore through said end wall and opening through said end wall, and a first circumferential groove in said side wall and opening into said bore, a nut having a non-circular head portion, an annular portion receivable in said bore of said body, a second passage through said nut and communicating with said first internal passage in said body and having internal threads substantially coaxial with said annular portion, and a circumferential groove in said annular portion opening to the exterior thereof and complementary with said groove in said body to define a retainer passage, a retainer received in said retainer passage to rotatably mount said nut in said body for relative rotational movement between them, and said end wall of said bore having a sealing surface encircling said opening of said first passage through said end wall, disposed radially inward of said annular portion of said nut and being constructed and arranged for sealing engagement with an annular seal carried by an adapter threaded into said nut to urge the annular seal into engagement with said sealing surface of said end wall and without engagement of the annular seal by the nut.

2. The fluid connector fitting of claim 1 wherein said fitting body has a radial passage that opens into said retainer passage.

3. The fluid connector fitting of claim 1 wherein said retainer comprises a wire inserted through said radial passage and into said retainer passage.

4. The fluid connector fitting of claim 1 wherein said head portion of said nut has a hexagonal configuration outside of said body.

5. The fluid connector fitting of claim 1 which also comprises an adapter body having an end face with a through bore communicating with said first internal passage, a recess in said end face and encircling said through bore, an O-ring seal in said recess, and said adapter being threadable into said nut to engage said sealing surface of said end wall with said O-ring seal to provide a fluid tight seal between said through bore of said adapter body and said first passage of said fitting body.

6. The fluid connector of claim 5 wherein the axis of said nut receiving bore is inclined at an acute included angle to the axis of said threaded connector portion in the range of about 30° to 90° and the distance between the end wall and the axis of said threaded connector portion is not greater than about the diameter of the portion of the first internal passage extending through said connector portion.

7. The fluid connector of claim 5 wherein the distance between the end wall and the axis of said threaded connector is not greater than about the diameter of the portion of the first internal passage extending through said connector portion.

8. The fluid connector fitting of claim 1 wherein the axis of said nut receiving bore is inclined at an acute included angle to the axis of said threaded connector portion.

9. The fluid connector of claim 8 wherein said acute included angle is about 90°.

10. The fluid connector of claim 8 wherein said acute included angle is about 45°.

11. The fluid connector of claim 8 wherein said acute included angle is in the range of about 30° to 60°.

12. The fluid connector of claim 1 wherein the axis of said nut receiving bore is substantially coaxial with the axis of said threaded connector portion.

13. The fluid connector of claim 1 wherein the axis of said nut receiving bore is inclined at an acute included angle to the axis of said threaded connector portion in the range of about 30° to 90° and the distance between the end wall and the axis of said threaded connector portion is not greater than about the diameter of the portion of the first internal passage extending through said connector portion.

14. The fluid connector of claim 1 wherein the distance between the end wall and the axis of said threaded connector is not greater than about the diameter of the portion of the first internal passage extending through said connector portion.

* * * * *